(12) United States Patent
Kaza et al.

(10) Patent No.: US 10,740,955 B2
(45) Date of Patent: Aug. 11, 2020

(54) SYSTEMS AND METHODS FOR REAL-TIME LARGE-SCALE POINT CLOUD SURFACE RECONSTRUCTION

(71) Applicant: Cesium GS, Inc., Philadelphia, PA (US)

(72) Inventors: Srinivas Kaza, Burr Ridge, IL (US); Patrick Cozzi, Drexel Hill, PA (US); Sean Lilley, Exton, PA (US)

(73) Assignee: Cesium GS, Inc., Philadelphia, PA (US)

( * ) Notice: Subject to any disclaimer, the term of this patent is extended or adjusted under 35 U.S.C. 154(b) by 213 days.

(21) Appl. No.: 15/829,786

(22) Filed: Dec. 1, 2017

(65) Prior Publication Data

US 2019/0172249 A1 Jun. 6, 2019

(51) Int. Cl.

| G06T 15/08 | (2011.01) |
|---|---|
| G06T 7/12 | (2017.01) |
| G06T 7/60 | (2017.01) |
| G06T 5/00 | (2006.01) |
| G06T 5/20 | (2006.01) |
| G06T 7/187 | (2017.01) |

(52) U.S. Cl.
CPC .............. G06T 15/08 (2013.01); G06T 5/002 (2013.01); G06T 5/005 (2013.01); G06T 5/20 (2013.01); G06T 7/12 (2017.01); G06T 7/187 (2017.01); G06T 7/60 (2013.01); G06T 2207/20032 (2013.01); G06T 2207/20192 (2013.01)

(58) Field of Classification Search
CPC ........... G06T 7/187; G06T 7/12; G06T 5/002; G06T 5/005; G06T 5/20; G06T 7/60
See application file for complete search history.

(56) References Cited

PUBLICATIONS

Pintus, Ruggero et al., "Real-time rendering of massive unstructured raw point clouds using screen-space operators", in: Dellepiane, Matteo et al., "VAST'11 Proceedings of the 12th International conference on Virtual Reality, Archaeology and Cultural Heritage" Eurographics Association Aire-la-Ville, Switzerland, Oct. 18, 2011, 8 pages.
Preiner, Reinhold et al., "Auto Splats: Dynamic Point Cloud Visualization on the GPU", in: Childs, H. et al, "Proceedings of Eurographics Symposium on Parallel Graphics and Visualization", May 13-14, 2012, 10 pages.

*Primary Examiner* — Edward Park
(74) *Attorney, Agent, or Firm* — Carr & Ferrell LLP

(57) ABSTRACT

A system and method of real-time surface reconstruction upon unstructured point clouds via a series of screen space operations are provided herein. A point occlusion operator, performed in a deferred pass upon a simple point splat, is used to determine point visibility and an ambient occlusion factor to estimate a solid angle of a visibility cone produced by each point in the splat by splitting the screen space local neighborhood of the point into sectors and accumulating the maximum viable sector angle. Points are valid or invalid. A density estimation pass is then used. Maps are used to determine the required number of region growing iterations to cover every invalid pixel. The density is then pruned by edge creep reduction to minimize the error around edges. A median filter is used to fill invalid pixels, while edge-preserving blur is applied to the valid pixels.

20 Claims, 14 Drawing Sheets

SYSTEMS AND METHODS FOR REAL-TIME LARGE-SCALE POINT CLOUD SURFACE RECONSTRUCTION

FIELD OF INVENTION

The present disclosure is directed to digital image processing, and more specifically, but not by way of limitation, to systems and methods for real-time large-scale point cloud surface reconstruction using screen space operations, including a point visibility test, edge removal filter, and sparse region growing.

SUMMARY

According to some embodiments, the present disclosure is directed to a method for real-time large scale point cloud surface reconstruction, the method comprising: (a) receiving a large scale point cloud comprising a plurality of unstructured splatted points that each comprise a pixel; (b) performing a plurality of screen space operations on the plurality of unstructured splatted points; (c) applying an edge removal filter to the plurality of unstructured splatted points; and (d) performing sparse region growing to the filtered plurality of splatted points to reconstruct the plurality of unstructured splatted points into a reconstructed point cloud surface.

According to some embodiments, the present disclosure is directed to a system, comprising: a processor; and a memory for storing executable instructions, the processor executing the instructions to: receive a large scale point cloud comprising a plurality of unstructured splatted points that each comprise a pixel; perform a plurality of screen space operations on the plurality of unstructured splatted points; apply an edge removal filter to the plurality of unstructured splatted points; and perform sparse region growing to the filtered plurality of splatted points to reconstruct the plurality of unstructured splatted points into a reconstructed point cloud surface.

According to some embodiments, the present disclosure is directed to a method for extracting a surface described by a point cloud, the method comprising: utilizing a first heuristic (e.g., point space operator or also referred to as a "point occlusion operator" or "point visibility operator") to determine visibility of points in a point cloud through screen space operators applied on a point splat by encoding of pixel depth as a value representing a length of a ray in a direction and position of a primary ray corresponding to the pixel; transforming the encoding using a triangle wave function; filling holes in the point splat based on a median filter and edge-preserving blur by utilizing a comparison that sorts pixel attributes by depth; and utilizing a second heuristic (referred to as an "edge creep reduction operator" or "edge culling operator") to prevent unwanted region growing near edges of the surface, while applying one or more stencil operations, stencil functions, and a stencil buffer to efficiently restrict this unwanted region growing to a desired region.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
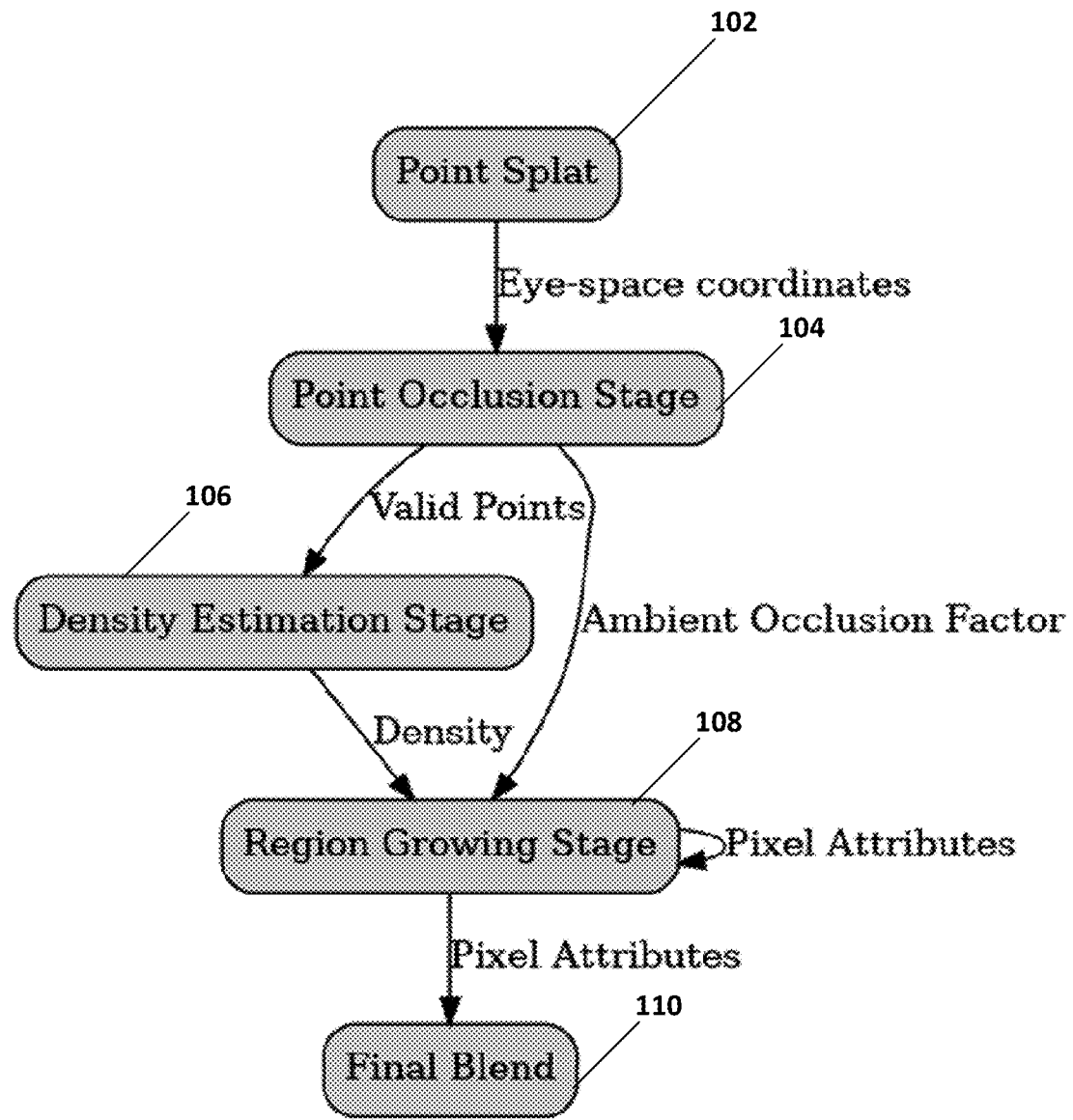
FIG. 1 is a schematic diagram of an example method of the present disclosure for real-time large scale point cloud resurfacing.

For context, a point cloud is a set of points, often used as a sparse representation of the surface of an object. Point cloud datasets are often generated by 3D scanning devices, using technologies such as laser triangulation, structured light, and time of flight, and have become a common format for describing complex 3D scenes. However, the sparse nature of point clouds is an obstacle for portraying surfaces thereof. In some instances, triangulation is used to generate a mesh from the original point cloud data, but such methods are too slow to be computed online. For applications that need to compute a surface in real-time, a different method must be used. The present disclosure provides advantages and overcomes these stated drawbacks.

The present disclosure provides systems and methods of real-time surface reconstruction upon unstructured point clouds via a series of screen space operations. In some embodiments, a point occlusion operator, performed in a deferred pass upon a simple point splat, is used to determine point visibility and the ambient occlusion factor. This point occlusion operator estimates the solid angle of the visibility cone produced by each point in the splat by splitting the screen space local neighborhood of the point into sectors and accumulating the maximum viable sector angle. Points with a sufficient solid angle are marked as valid. A density estimation pass is then used to determine the distance from every invalid pixel to the nearest valid pixel. These maps are used to determine the required number of region growing iterations to cover every invalid pixel.

The density is then pruned by an edge creep reduction step in order minimize error around edges during the next step. To fill the areas indicated by the density estimation pass, a median filter is used to fill invalid pixels, while an edge-preserving blur is applied to the valid pixels.

In general, the present disclosure comprises processes that include constructing a dense surface from a point cloud in real-time using, for example, screen space operations. In some embodiments, a point occlusion pass determines a visibility of the splatted points, and a region growing pass is used to fill the empty regions and blur the filled regions.

In an effort to perform a fewest number of iterations of region growing necessary, a density map can be computed of a scene or surface, which stores a distance to a nearest valid pixel. This map is conceptually similar to, for example, a Voronoi diagram. At the same time, the systems and methods of the present disclosure prune density near edges of the map using, for example, an edge creep reduction operator as part of the density estimation pass. In various embodiments, stenciling is used to apply region growing to the appropriate regions of the image (such as one or more surfaces in the image). The systems and methods of the present disclosure can also comprise the computation of an ambient occlusion term in the point occlusion pass, which is used when the point cloud is blended into the image.

Referring now to FIG. 1, which is a flow diagram of an example method that can be executed in accordance with the present disclosure to provide real-time, large-scale, point cloud surface reconstruction.

Operations of the systems and methods described herein relate to point cloud post-processing occurring in screen space. Unlike operations in object space, which are applied on a per-vertex or per-primitive basis, screen space operations are applied on a per-pixel basis. Screen space operations are advantageous for use in accordance with the present disclosure because a point primitive can be represented in screen space by a single pixel. Thus, performing tasks via a pixel or fragment shader can be equivalent to performing the same tasks on 3D points in object space, although processes of point splatting can involve ignoring fragments that are rasterized onto the same pixel. Thus, there exists a frustum behind every splatted pixel which is a blind region in the screen space.

The method includes a step 102 of receiving a point splat. After the point splat is received, in some embodiments, a point occlusion operator is utilized in step 104. The point occlusion operator uses eye-space coordinates provided by a floating-point texture equation: (f (u, v)=[ex, ey, ez]). This operator returns either a valid value in the form of a single linearized depth, or an invalid value.

The point occlusion operator is responsible for determining whether or not a point is visible to the camera (e.g., a view frustum). The metric of visibility corresponds to a maximum solid angle that can be produced by a cone in object space without clipping into another point within the object space. Occluded points have a narrow solid angle, while visible points have a wide solid angle.

That said, in some embodiments, a pixel to point bijection is not required. The systems and methods of the present disclosure employ, in some embodiments, linear point attenuation to scale the size of a point splat from a near plane to a far plane. As a result, a single point may be represented by four, nine, or more pixels.

Adapting these concepts to screen space, rather than object space requires several modifications. Initially, the notion of "maximum viable solid angle" is fragile because of edge cases produced when a solid angle is computed at surface edges. Hence, the systems and methods of the present disclosure are adapted, in some embodiments, to approximate the "maximum viable solid angle" by splitting a visibility cone into several sectors and accumulating the maximum solid angle in each sector. The process of sampling points in a 3D neighborhood, as performed with respect to object space, is replaced by sampling nearby pixels in screen space.

The systems and methods of the present disclosure are configured to compute a solid angle per sector by determining an angle between an eye-space vector from a viewer (e.g., a camera or view frustum) to a point of interest, and a vector offset of a horizon point from the point of interest. To be sure, this angle is computed in eye-space, using the eye-space map mentioned earlier. Given that the solid angle per sector is in the range [0, π], the accumulated solid angle across all sectors (assuming eight sectors), is [4π]. Points with accumulated solid angles that are under a certain threshold are marked as invalid. This value is normalized to produce the aforementioned ambient occlusion factor.

Additionally, precision improvements and refinements are disclosed. In some embodiments, the point occlusion operator can write out a linearized depth value that is normalized from the near planes to the far planes of the view frustum. For very large datasets, this practice tends to lose depth precision, which in turn causes aliasing in the region growing stage. In response, the systems and methods of the present disclosure can implement two improvements that can be performed to preserve depth precision.

Figure 2:
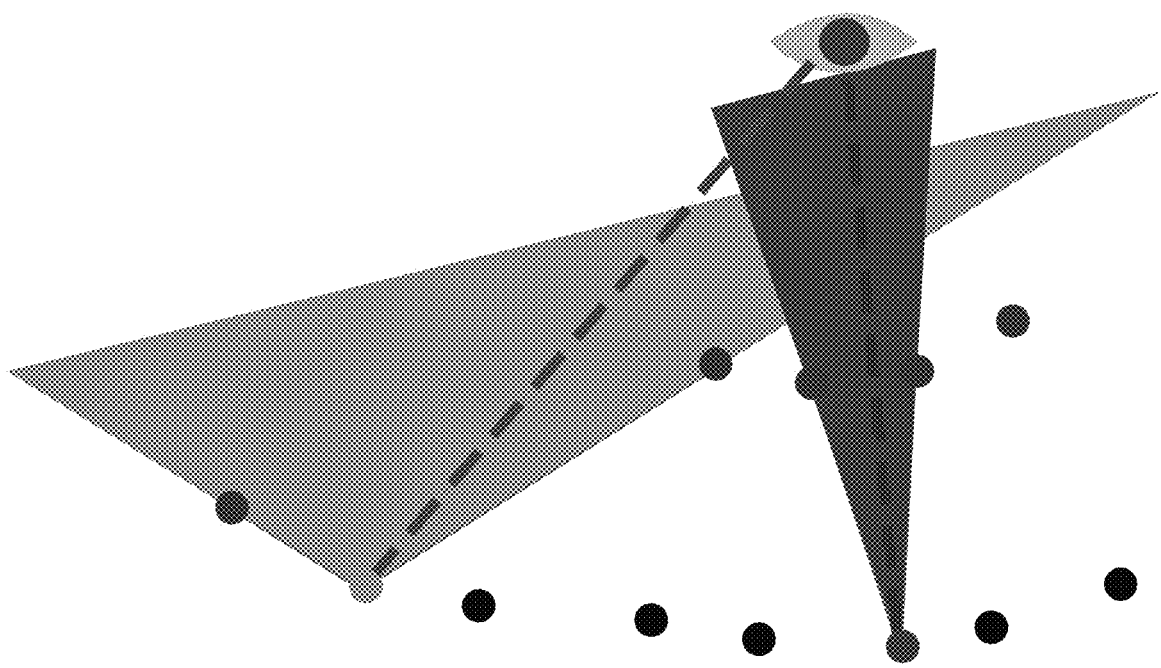
FIG. 2 illustrates an example point occlusion operation, which is a portion of a process of the present disclosure.

Normally depth is represented by a z value transformed by the inverse function, and normalized to the [1, 1] range. Precision can be improved by sampling on the primary ray itself rather than on the z-axis if the gradient of the depth is not in the direction of the z-axis. Given an eye-space coordinate $\vec{e}$, this value is $|\vec{e}|$. Reconstructing eye-space coordinates in later stages is trivial given the ray vector and ray origin. A ray distance precision operation is depicted in FIG. 2. FIG. 2 depicts one point being occluded because its accumulated solid angle is too small, while another passes the test. Again, this operation is optional in some embodiments and can be replaced with a process that utilizes only eye-space coordinates. This diagram depicts one point being occluded because its accumulated solid angle is too small, while another passes the test.

Another improvement involves an assumption that the local depth neighborhood of a given pixel is similar to the pixel itself. Stated otherwise, it is assumed that for depth image D with a pixel of interest located at i,j that the following property holds:

$$\max(|D_{ij}-D_{mn}\forall m\in[-1,1]\forall n\in[-1,1]|)<\mathcal{E}_d.$$

Figure 3:
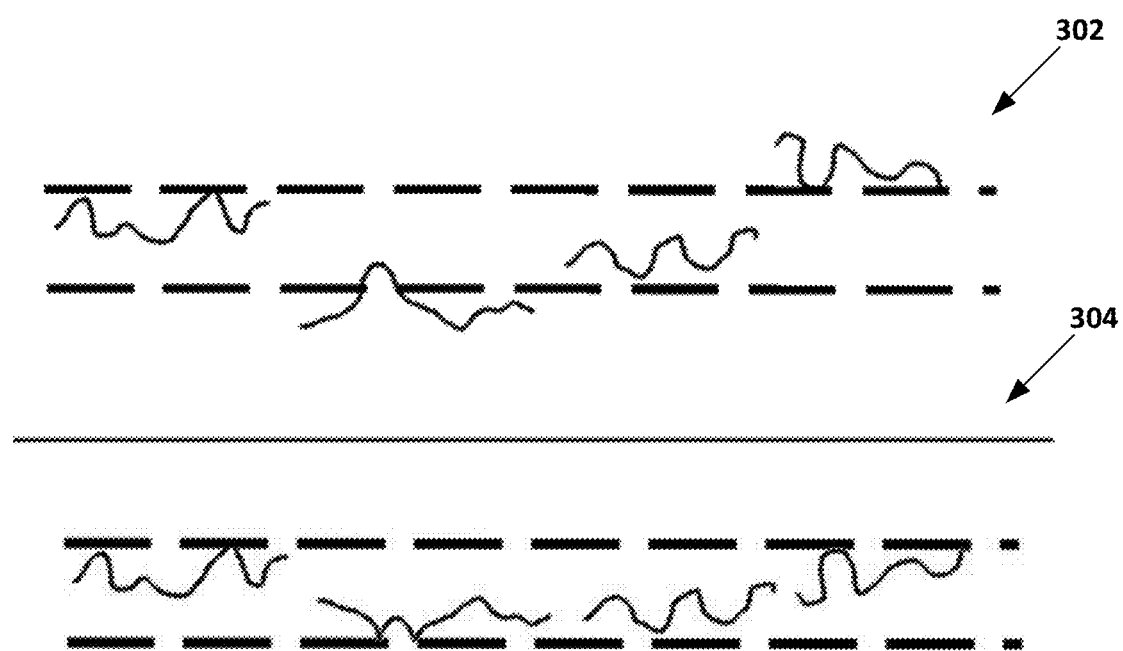
FIG. 3 illustrates the application of a triangle wave function illustrating a graphical depiction of original depth and a transformed depth.

This assumption hold true because the edge-preserving blur aspect of the region growing step is similar to a bilateral filter, where a contribution of a given pixel to the blur is directly related to its intensity. Hence, the systems and methods can effectively ignore contributions from depth deltas that are greater in value than $E_d$. The point occlusion operator exploits this property by passing the ray distance into a triangle wave function, described by:

$$W(x, p) = \left|\frac{x \bmod p}{p} - \frac{1}{2}\right|$$

where p is the period of the wave function. The wave function is piecewise linear and $C_0$ continuous, which prevents aliasing from local neighborhood discontinuities. FIG. 3 illustrates the application of a triangle wave function illustrating a graphical depiction 302 of original depth and the transformed depth 304.

It will be understood that large depth discontinuities may occur in the surface. Two separate surfaces which happen to map to similar values as a result of the wave function would be considered similarly, resulting in false similarity. To prevent false similarity from occurring as a result of wrap-around, the triangle wave function period is chosen such that it is about two orders of magnitude greater than $E_d$ such that the odds of false similarity occurring, assuming that the distribution of depth across the scene is uniform within the period of the wave function, is acceptably small.

In some embodiments, internally, both the ray distance and triangle wave steps use 64-bit emulated primitives for the intermediary steps, but return a 32-bit value.

With respect to the aspect of density estimation step 106 illustrated in FIG. 1, it will be understood that the density estimation step is utilized determine a distance from every invalid pixel to the nearest valid neighbor pixel. This process functions much like the point occlusion step in terms of sampling neighbors. For every invalid pixel, the systems and methods will determine how many region growing iterations would be required to reach that location from the nearest valid pixel. This value is referred to as the density, and the construction of the density map resembles the construction of a Voronoi diagram. Pixels that are already valid have a density of one (1.0).

With respect to edge creep reduction, it will be noted that additional iterations of region growing can function to fill the empty areas around edges. This behavior can create the undesirable appearance of thick edges. As part of the density estimation stage, the density value around edges can be invalidated in order to prevent edge creep. This process can involve the computation of two metrics. The first metric is a sum of offsets to every neighboring pixel. The second metric is a sum of the absolute values of the offsets to every neighboring pixel, divided by the absolute value of the first metric. The following equations are applied:

$$A(i, j) = \sum_{x=i-n}^{i+n} \sum_{y=j-m}^{j+m} [\![D(x, y) | = 0]\!][x, y]$$

$$B(i, j) = \frac{\sum_{x=i-n}^{i+n} \sum_{y=j-m}^{j+m} [\![D(x, y) | = 0]\!][|x|, |y|]}{|A(i, j)|}$$

(where D(i, j) is the depth, invalid values are represented by zeros)

A pixel p fails metric A if Ap>$E_A$, and metric B works the same for $E_B$. If both metrics fail, then that pixel will be ignored during the region growing stage.

Figure 4:
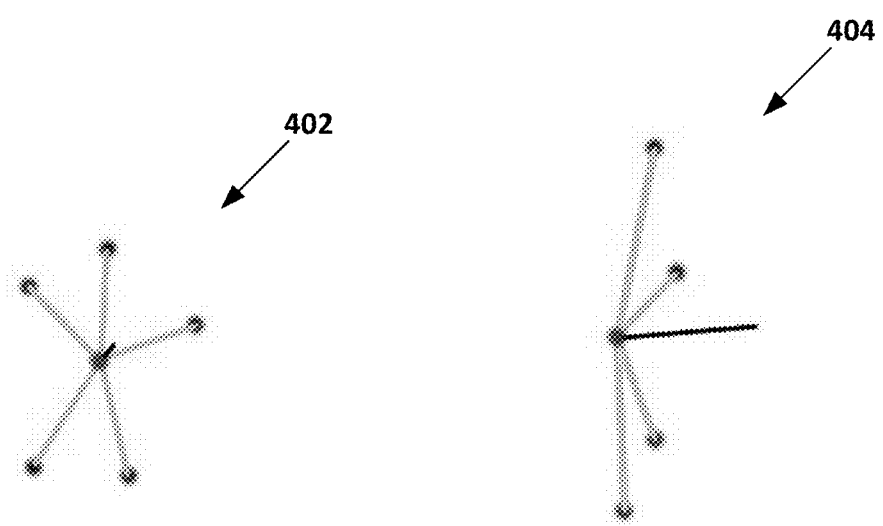
FIG. 4 illustrates the operations of an edge culling metric with respective plots.

FIG. 4 illustrates the operations of an edge culling metric A, where plot 402 is a uniform neighborhood, and plot 404 is an edge neighborhood. Both of these metrics assume that the local neighborhood of a pixel that is not on an edge is uniformly distributed.

With respect to the step(s) 108 of region growing illustrated in FIG. 1, after the point occlusion stage, valid pixels in the linearized depth buffer (i.e., the ray distance) are considered to be visible to the viewer (e.g., camera or view frustum). Additionally, as a result of the density estimation stage, distances from all the invalid pixels to their nearest valid neighbors are now known. The goal of the region growing stage is to fill in the invalid pixels based on nearby valid pixels and to blur the valid pixels based on an edge-preserving blur.

In various embodiments, the region growing stage utilizes the color map of the point cloud from the initial point splat, the linearized depth buffer and ambient occlusion map from the point occlusion stage, and the density map from the density estimation stage. These sources give the region growing stage a total of three attributes: color, depth, and ambient occlusion factor; as well as a density parameter which determines when the region growing operator should be applied to a given pixel—just to name a few.

For invalid pixels, the region growing stage uses a zero-elimination 3×3 depth-based median filter to determine the neighbor to fill the pixel. Due to the complications imposed by the zero-elimination, a comparison network sort is used to sort the depth neighborhood and select the median, in some embodiments.

For valid pixels, the region growing stage uses an approximation of the bilateral filter to blur the depth, color, and ambient occlusion attributes. Each attribute is updated with a weighted sum of its neighbors, where the weights are represented by the following equation:

$$w_i = \left(1 - \frac{\tau_i}{2}\right)\left(1 - \min\left(1, \frac{|z_i - z_0|}{\delta}\right)\right)$$

Screen space ambient occlusion can be utilized to perform a Gaussian blur to smooth out noise. This blur behaves much like a Gaussian filter on an ambient occlusion map. To that end, weighting coefficients have already been computed as part of the color blur. Unlike the previous stages, the region growing stage is iterative. Each iteration dilates the valid regions with a 3×3 structuring element. The systems and methods disclosed herein can employ a strategy to perform iterative post-processing filters to render to one framebuffer on every odd iteration, and another framebuffer on every even iteration, using the bound textures from the other framebuffer for attribute data.

Figure 5:
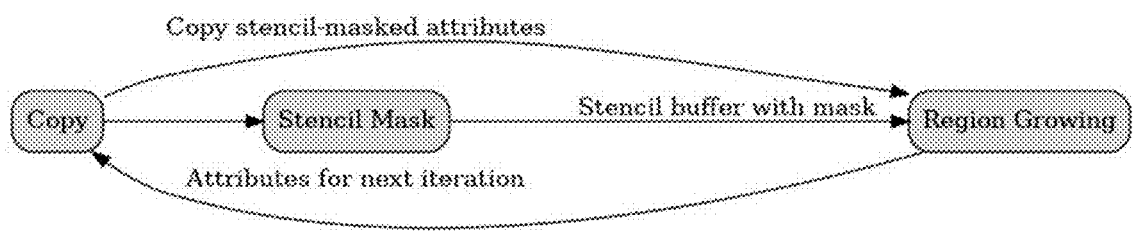
FIG. 5 is a flow diagram of an example stencil buffering process of the present disclosure.

A naive way to perform region growing would involve applying the region growing filter on the entire frame, but only performing the median filter on invalid pixels with the appropriate density for the iteration (i.e., a pixel with a density value of four would not be region grown on the first iteration because there would be no suitable neighbor). A more efficient approach uses a hardware-based stenciling feature to filter out pixels that are not ready to be region grown. Hence, an additional pass is performed right before the region growing stage which writes the correct values to the stencil buffer. An example flow diagram of this process is illustrated in FIG. 5.

An additional optimization can be performed in which valid pixels (i.e., originally valid or filled during a prior iteration) only perform k iterations of blurring, where k is much smaller than the total number of region growing iterations. This optimization is permissible because additional iterations of blurring yield diminishing levels of smoothing. The k parameter is referred to generally as a blurring delay.

With respect to the step(s) of blending (and final blending 110) illustrated in FIG. 1, after several iterations of region growing, a filled framebuffer can be blended back into the scene. In general, the framebuffer referred to herein is a framebuffer containing eye-space, color, and ambient occlusion information for every pixel in a view frustum or screen. The eye-space information is utilized along with the depth from the default framebuffer (i.e., data that is not post-processed) for a final blending.

In another embodiment, the linearized depth attribute is converted back to standard inverse depth and the ambient occlusion factor is used to scale the color attribute. The ambient occlusion factor influences the lighting conditions of the scene. As such, in some embodiments, a sigmoid function is used to modify the ambient occlusion factor:

$$C(\alpha, x) = \alpha \frac{x}{\alpha - x + 1.0}$$

where α is a configurable parameter controlling the sharpness of the sigmoid

According to some embodiments, the systems and methods of the present disclosure may incorporate neighbor search optimization processes. In more detail, both the density estimation and point occlusion stages perform a wide neighbor search, requiring tens to hundreds of texture lookups per fragment shader invocation. This neighbor search is inefficient because neighboring invocations perform texture lookups at nearly the same locations. In fact, over 98.7% of the texture reads performed per invocation are also performed by other invocations. As a result, the systems and methods of the present disclosure implement a novel method of neighbor lookup.

In some embodiments, this method involves rendering a vertex buffer object that contains a point for every pixel on the screen. The vertex shader performs a texture lookup that checks whether or not the point (i.e., the pixel) is valid. If so, the vertex shader modifies the point size to the size of the filter. Otherwise, the point is transformed so that it will be clipped. A vertex attribute corresponding to the center of the point splat is also created. The fragment shader then performs an operation in terms of a pixel-neighbor relationship. For example, in the density estimation stage, the fragment shader would compute a Manhattan distance from the center vertex attribute to its current location. Then a blending operation is used to accumulate the results. In the case of density estimation, the blending operation would be a MIN operation, because it would select the nearest valid point. The point occlusion stage would be split into two stages, finding the nearest point in each sector (using the MIN operation), and then accumulating the sectors. The edge culling step would accumulate the neighbor vectors using the ADD operation. This optimization does not work well in all instances. The presence of a large texture cache makes redundant reads less of an issue. In some embodiments, an additional metric is utilized in the aforementioned edge culling methods, referred to as a distance constraint. The edge culling methods described above relate to a two-dimensional metric and are implemented to avoid unnecessary dilation. The distance constraint approach incorporates depth information to determine whether or not edge culling should be utilized. Thus, the distance constraint is a threshold inquiry that can be utilized to determine if edge culling is necessary.

Some embodiments can utilize eye-space coordinates in place of ray distance or linearized depth. In these embodiments, valid pixels correspond to three dimensional points in the coordinate system defined by the location and orientation of the camera. This metric uses the following equation and description:

Let, $$E_{min}(i, j) = \min_{x,y \in \{x=i-n...i+n, y=j-n...j+n\}} ([|E(x, y)| > 0]E(x, y))$$

(where E(x,y) represents the reprojected eye-space coordinate derived from the depth map value at location (x, y)); we define the metric $$C(i,j) = E_{min}(i,j) * \rho(i,j)$$

where ρ is the density at location (i,j)

It will be understood that for a pixel to pass metric C the value of C(i,j) must be less than a threshold value. Some embodiments of the present disclosure implement eye-space coordinates to explicitly represent a three-dimensional location of pixels rather than implicitly through pixel depth in order to avoid issues with depth precision and Cesium's multi-frustum implementation. The metric C(i, j) is an additional edge culling metric that complements other edge culling metrics disclosed in greater detail herein.

The systems and methods of the present disclosure can also be utilized to perform random dropout methods. For many applications, a configurable parameter to reduce the computational load of the technique in exchange for better performance is desired. This parameter is used to determine the likelihood that the radius of the nearest neighbor search used in the point occlusion and density estimation pass is scaled down. Because the radius scaling occurs randomly across the viewport, the quality of the resulting image degrades smoothly as the parameter is changed.

Figure 6A:
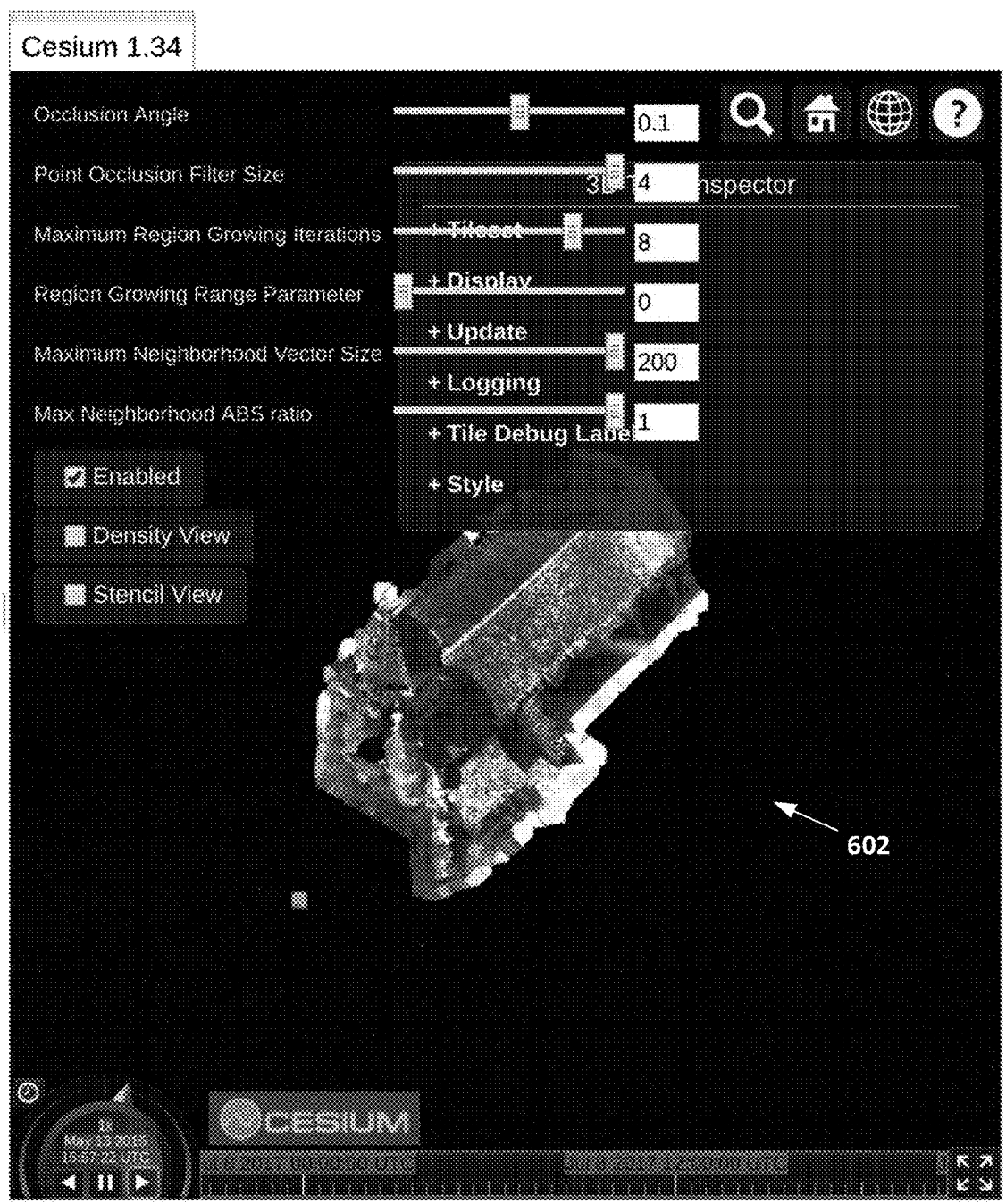
FIGS. 6A-F collectively illustrate an example method for reducing edge creep.
Figure 6B:
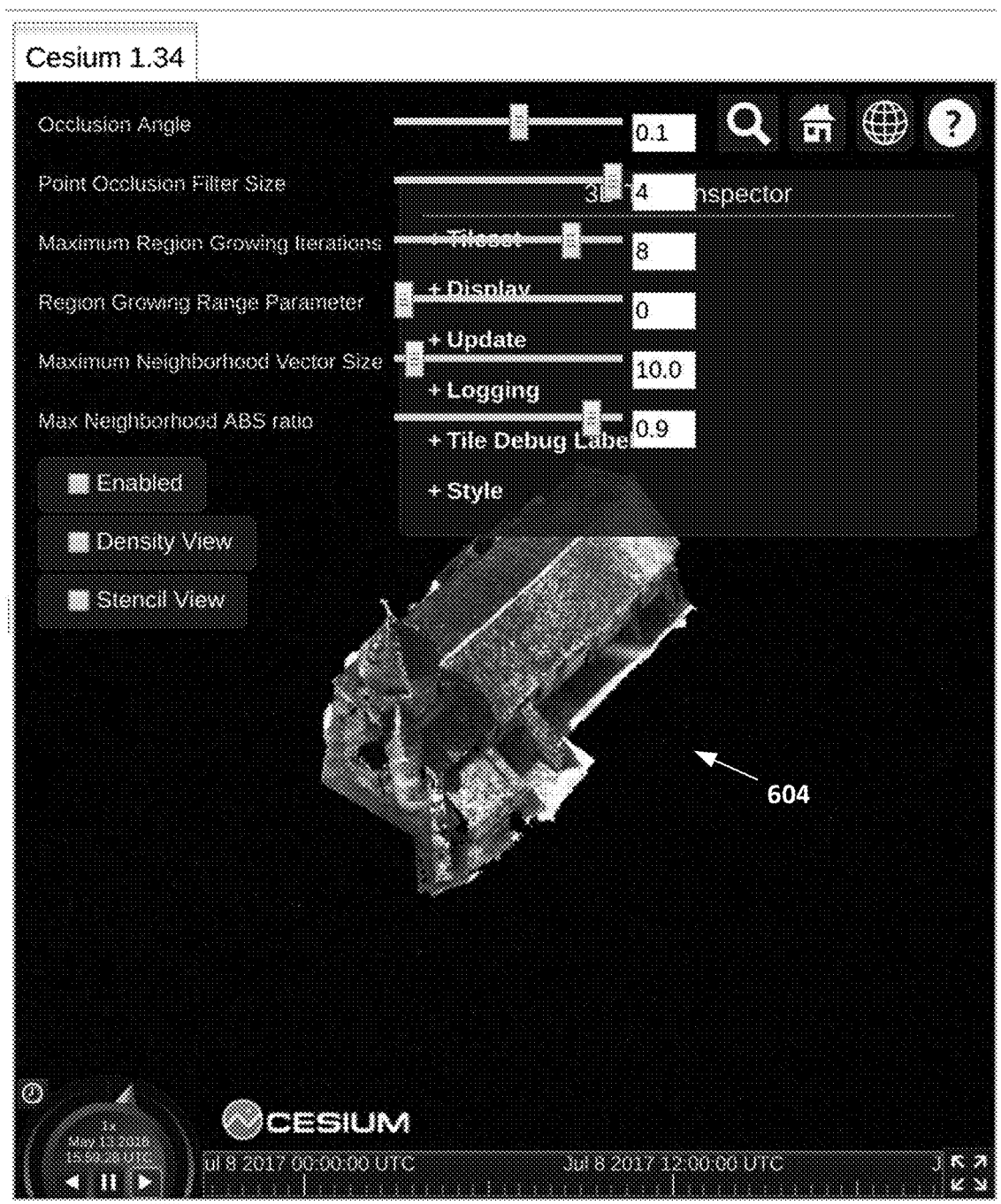

FIGS. 6A-F collectively illustrate an example method for reducing edge creep. In FIG. 6A, an example image of a church, represented as a church point cloud 602 where an edge creep filter has been disabled. FIG. 6B illustrates an image of a naive splat of a point cloud 604.

Edge creep occurs because a region growing stage attempts to grow an area near the edges of the point cloud 604, because the edges have sufficient screen-space density.

Figure 6C:
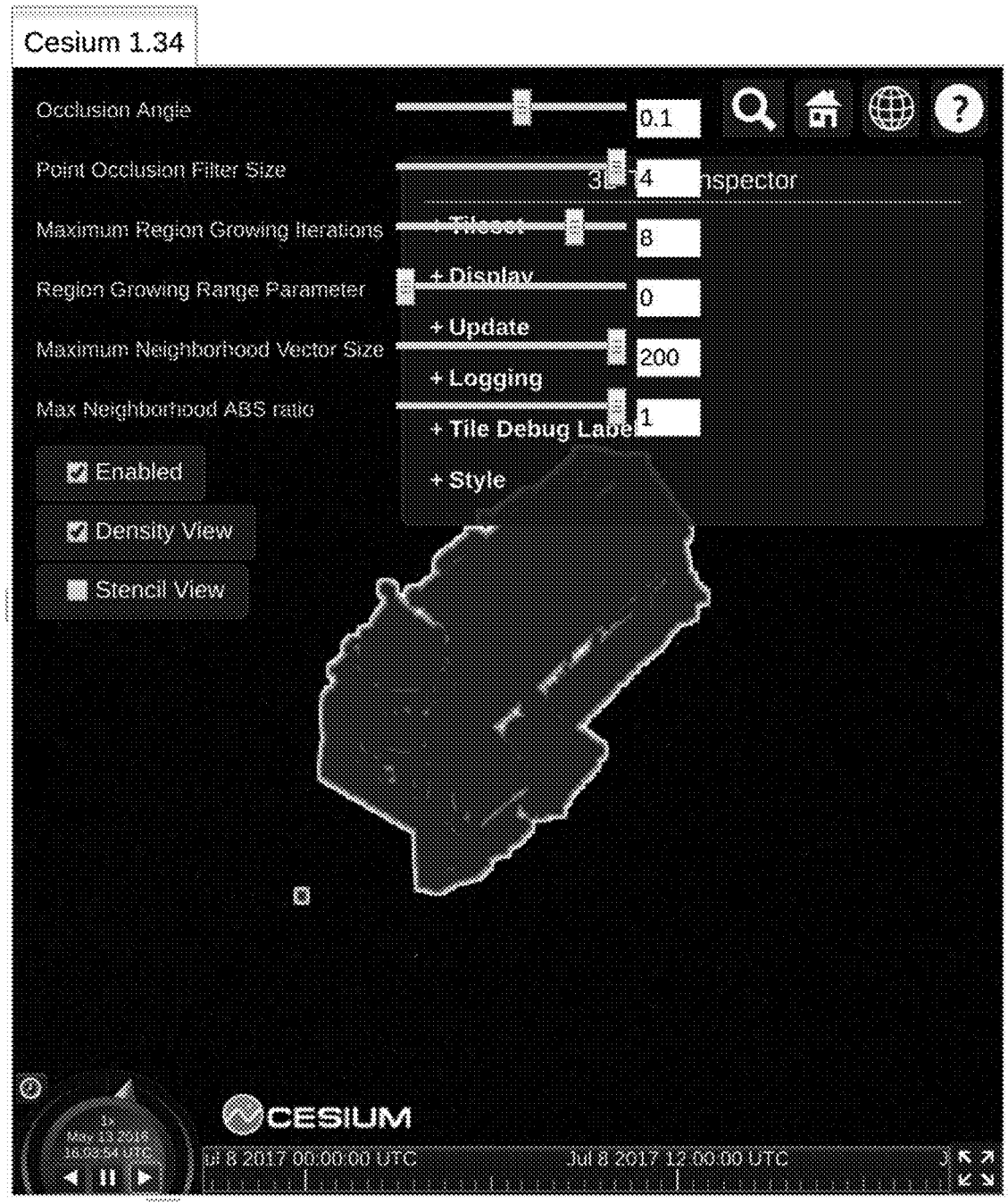
Figure 6D:
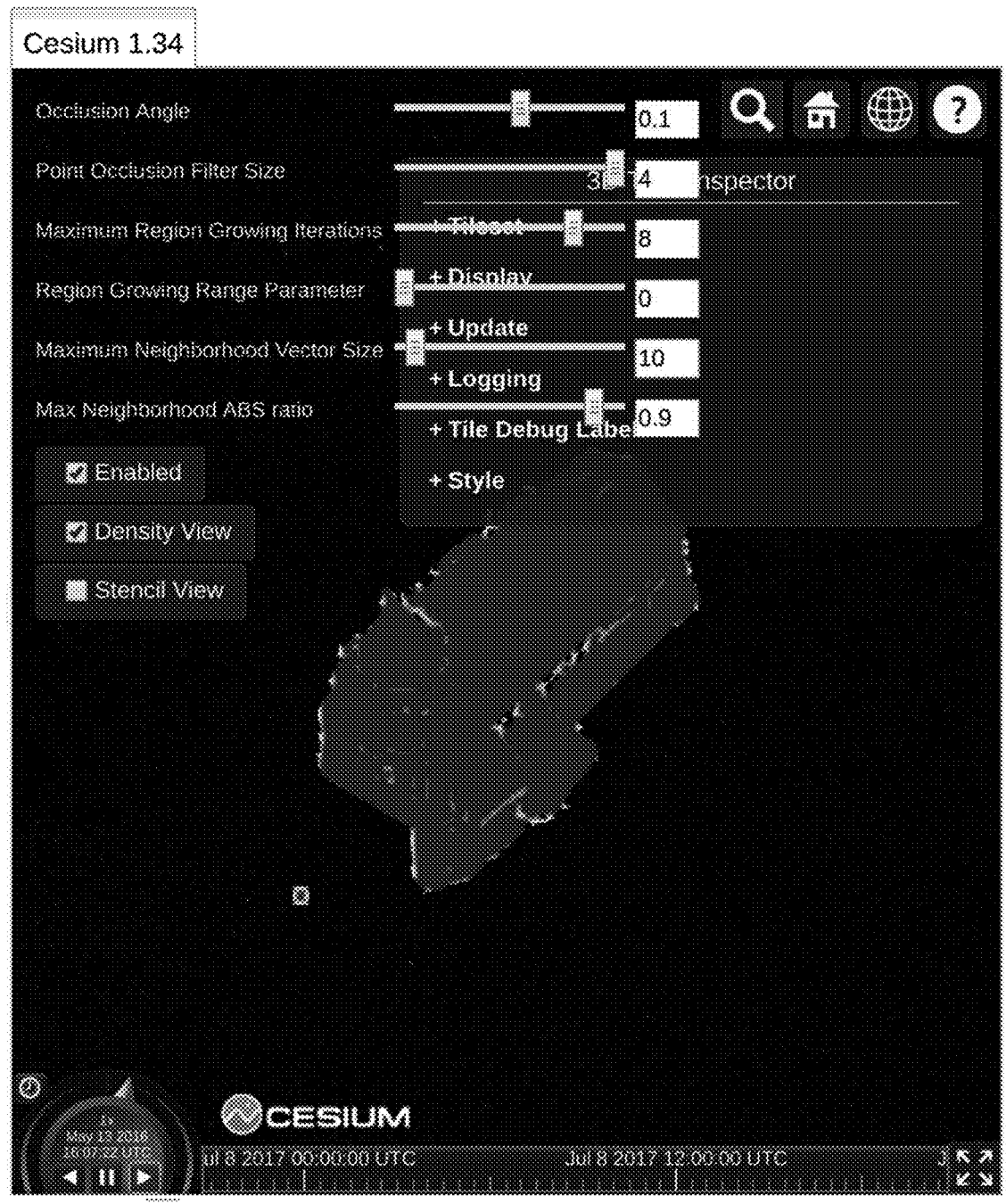
Figure 6E:
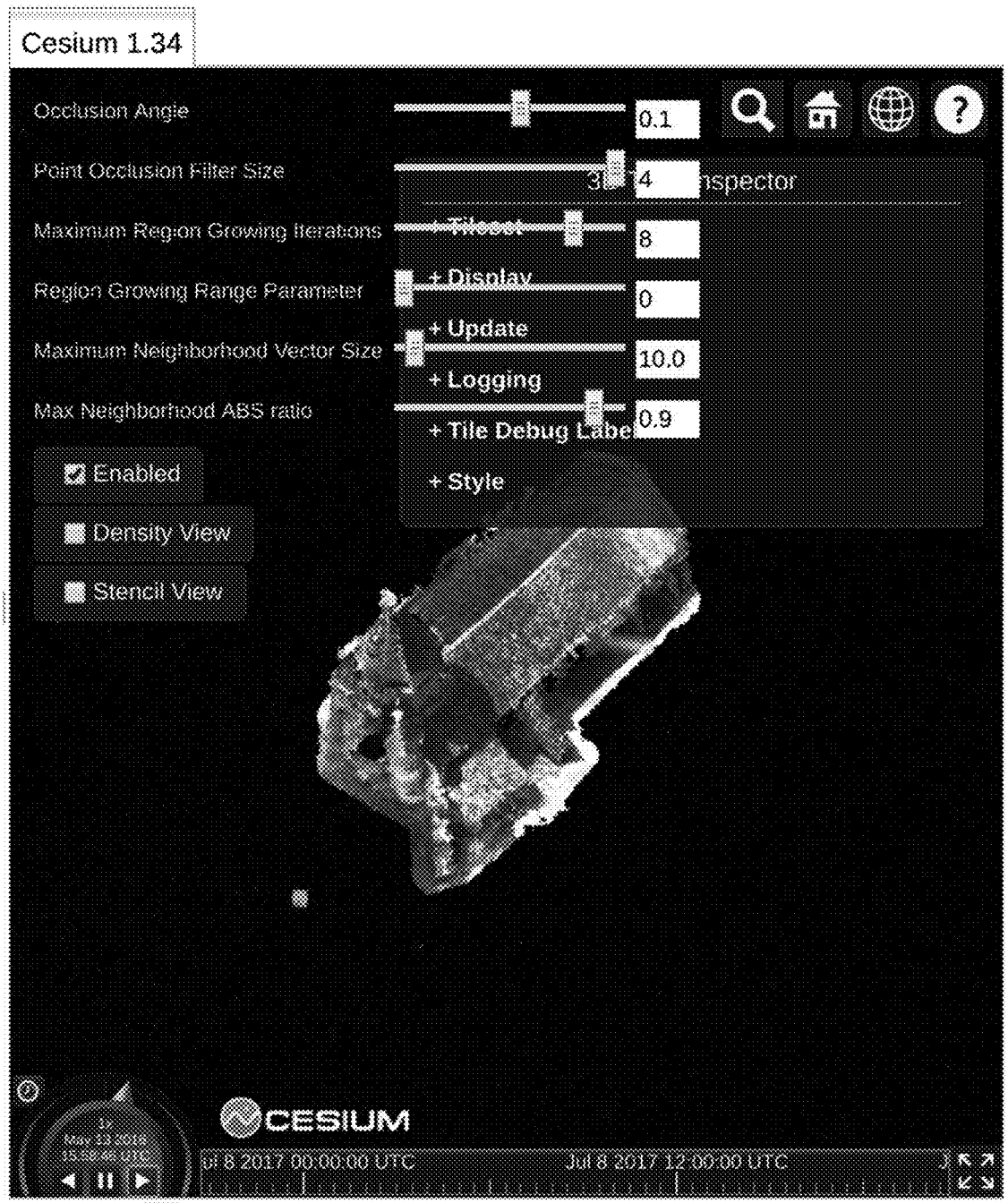
Figure 6F:
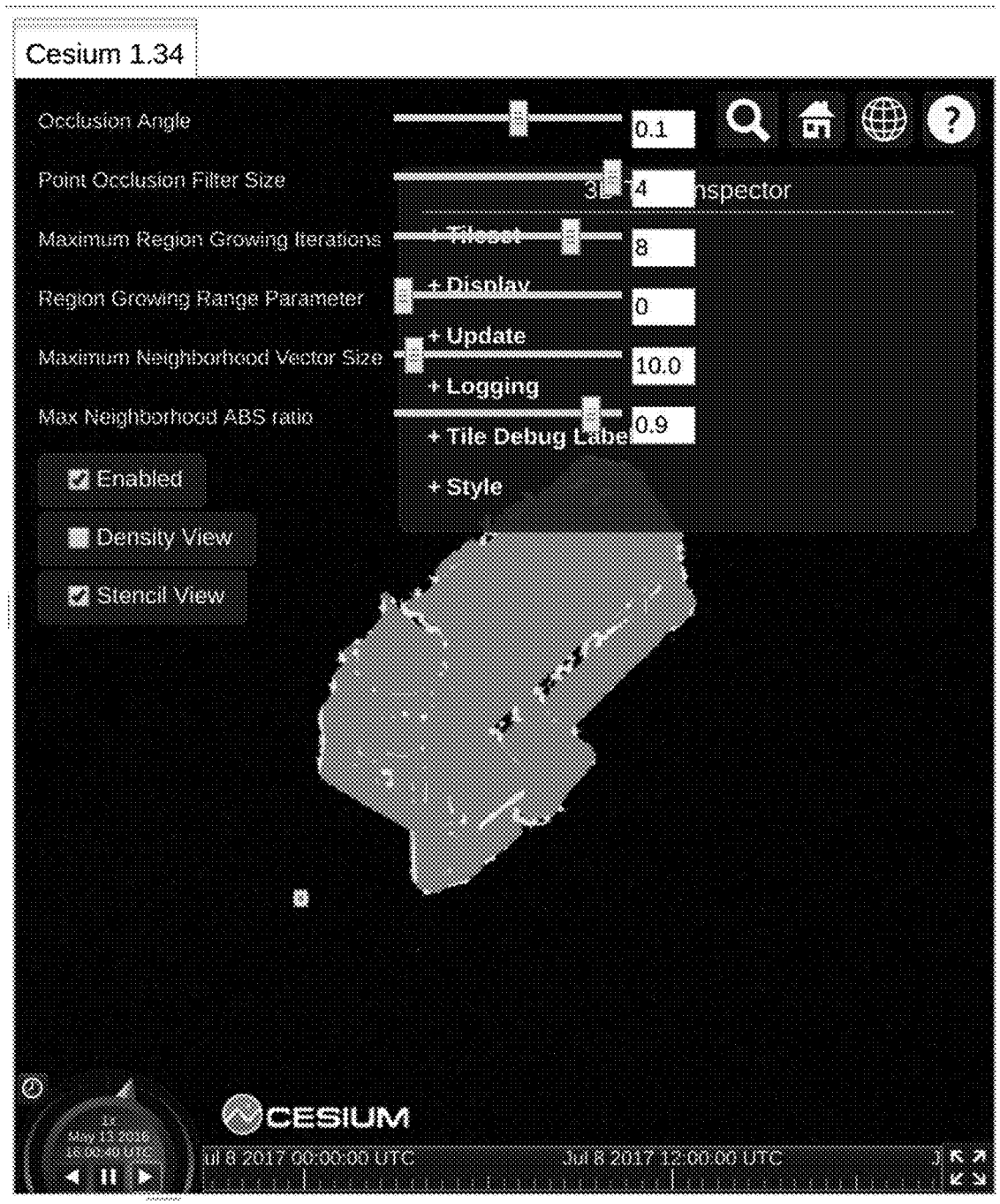

FIG. 6C illustrates a visualization of the point cloud density. FIG. 6D illustrates a process of edge culling in order to remove some of the white "halo" around the church by altering its density. FIG. 6E illustrates a processed version of the point cloud caused as a result of region growing in accordance with the present disclosure. Finally, FIG. 6F illustrates the use a couple iterations of region growing for nearly all the pixels. This reduction in iterations is made possible due to the use of stenciling processes described herein.

Figure 7:
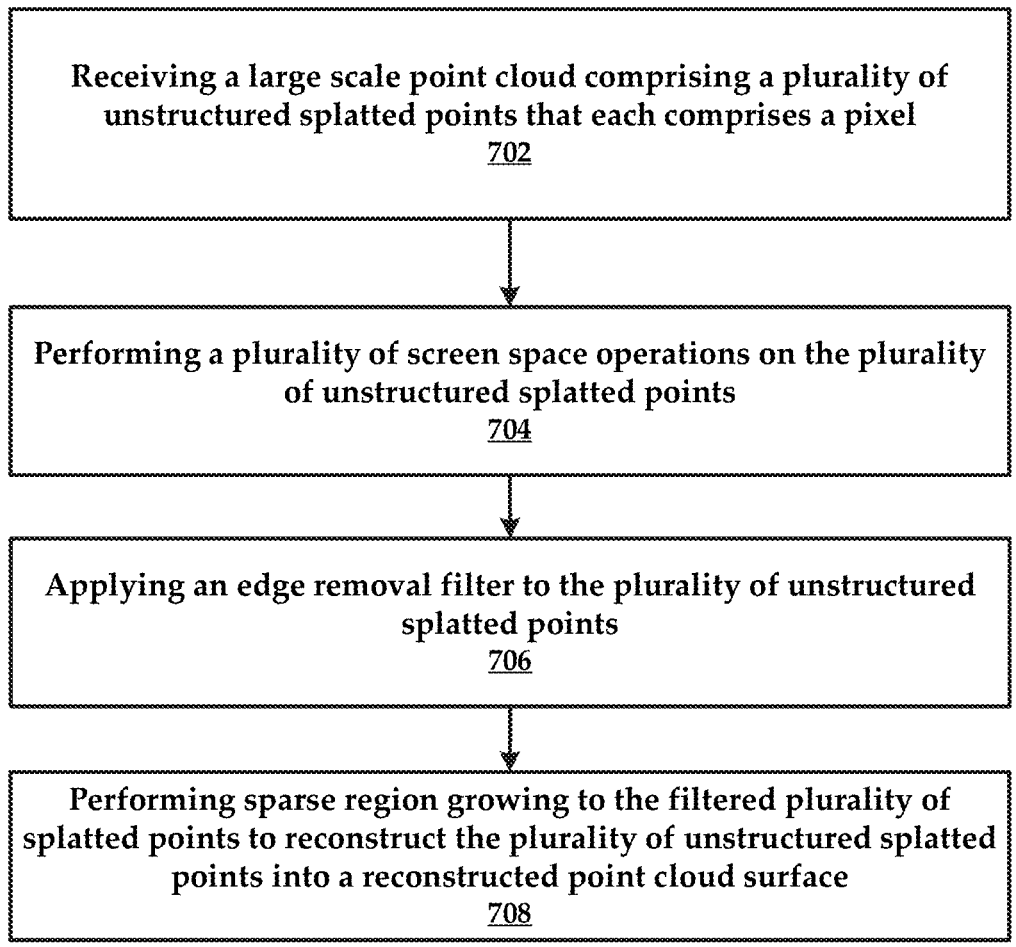
FIG. 7 is a flowchart of an example method of the present disclosure

FIG. 7 is a flow diagram of an example method of the present disclosure. The method comprises a step 702 of receiving a large scale point cloud comprising a plurality of unstructured splatted points that each comprises a pixel. Next, the method comprises a step 704 of performing a plurality of screen space operations on the plurality of unstructured splatted points, as well as a step 706 of applying an edge removal filter to the plurality of unstructured splatted points. In some embodiments, the method can include a step 708 of performing sparse region growing to the filtered plurality of splatted points to reconstruct the plurality of unstructured splatted points into a reconstructed point cloud surface.

Figure 8:
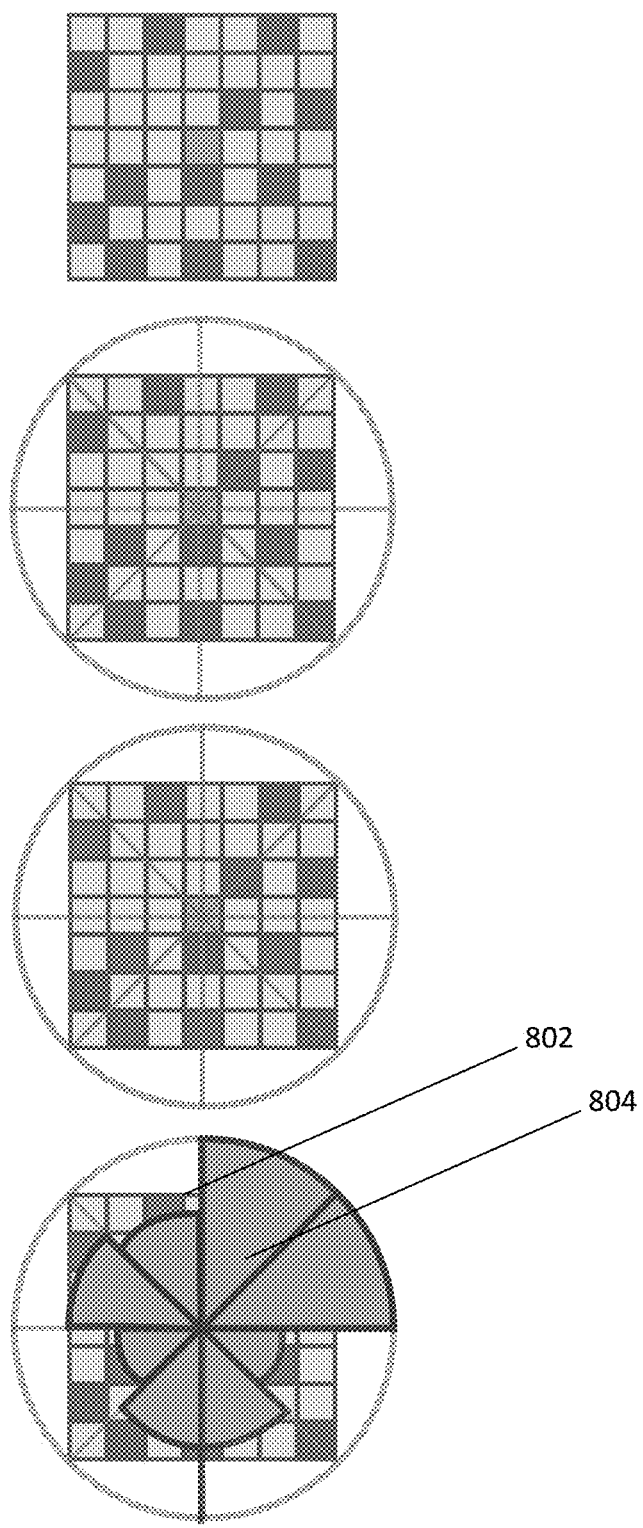
FIG. 8 illustrates the same point occlusion operator as FIG. 2, although in this depiction, regions such as 802 are horizon points, and regions such as 804 are sectors of the visibility cone.

FIG. 8 illustrates a diagram of a point occlusion/visibility operator. The arcs in the diagram are solid angles described by the point occlusion operator. In FIG. 8, regions such as region 802 are horizon points, and regions such as region 804 are sectors of the visibility cone.

Figure 9:
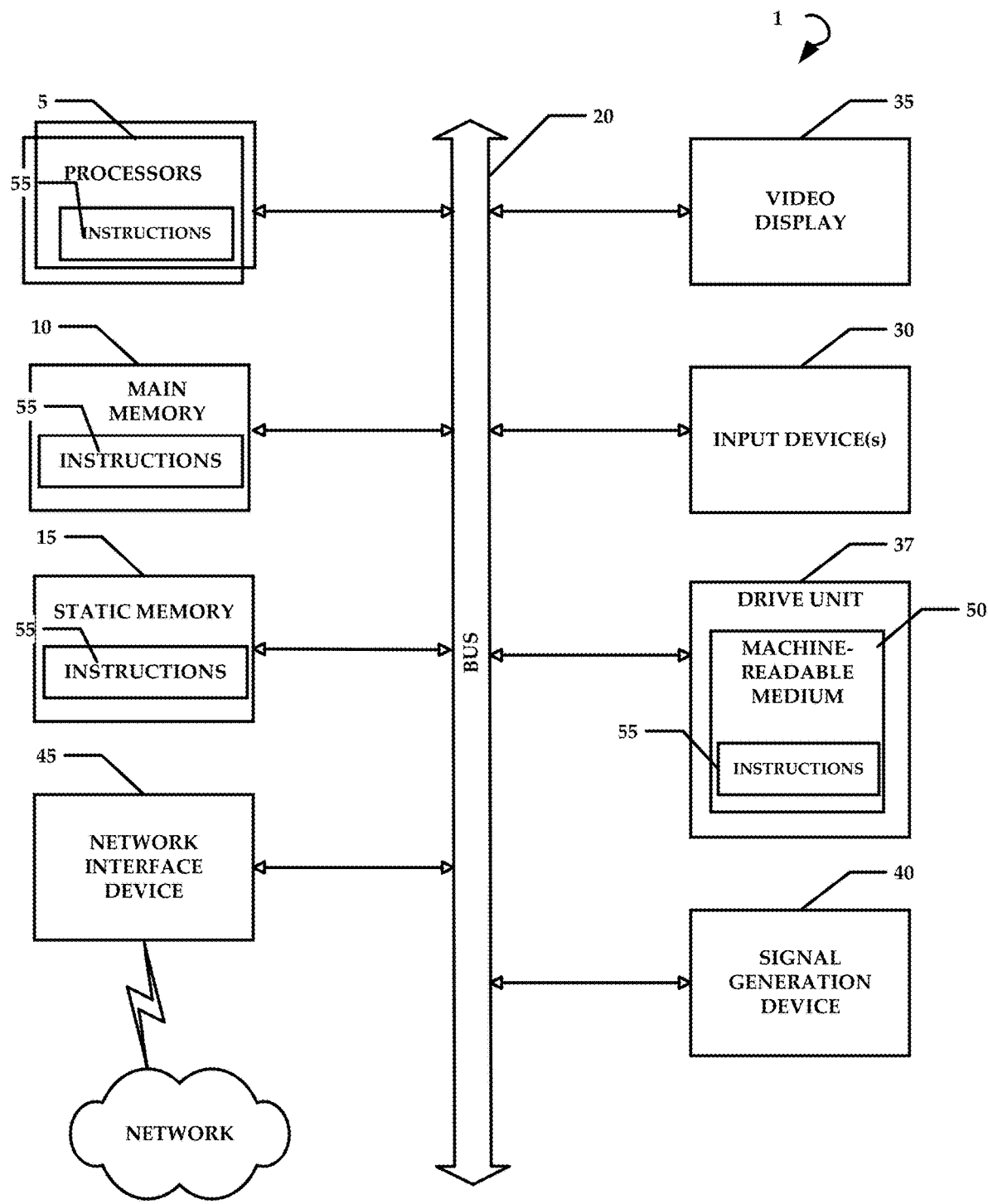
FIG. 9 illustrates an exemplary computing system that may be used to implement embodiments according to the present technology.

FIG. 9 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for real-time large scale point cloud surface reconstruction, the method comprising:
   receiving a large scale point cloud comprising a plurality of unstructured splatted points that each comprise a pixel;
   performing a plurality of screen space operations on the plurality of unstructured splatted points;
   applying an edge removal filter to the plurality of unstructured splatted points;
   performing sparse region growing to the filtered plurality of splatted points to reconstruct the plurality of unstructured splatted points into a reconstructed point cloud surface;
   determining visibility of splatted points in the point cloud, the splatted points each comprising at least one pixel;
   filling empty regions between the splatted points using stenciling;
   blurring filled regions within the point cloud; and
   computing an eye-space density map of a scene that comprises the point cloud.

2. The method according to claim 1, further comprising pruning density near edges of the eye-space density map using an edge creep operation during creation of the eye-space density map.

3. The method according to claim 1, wherein determining visibility of splatted points in the point cloud comprises:

performing point occlusion using eye-space coordinates provided by a floating-point texture function to generate a single linearized depth output or an invalid value, so as to determine the splatted points' visibility for a view frustum.

4. The method according to claim 3, further comprising enhancing precision of the point occlusion by sampling on a primary ray when a gradient of a depth of a splatted point of the splatted points is not in a direction of a z-axis.

5. The method according to claim 4, further comprising enhancing precision of the point occlusion by:
assuming a local depth neighborhood of the at least one pixel is similar to itself; and
processing a ray distance using a triangle wave function in order to prevent aliasing from local depth neighborhood discontinuities.

6. The method according to claim 1, further comprising calculating an approximation of a maximum solid angle that can be produced by a cone in an object space without clipping another point in the object space.

7. The method according to claim 6, wherein calculating the approximation of the maximum solid angle comprises: splitting a visibility cone into sectors and accumulating the maximum solid angle in each of the sectors.

8. The method according to claim 7, wherein calculating the approximation of the maximum solid angle comprises: for each of the splatted points:
determining an angle between an eye-space vector from a viewpoint of interest to a splatted point of the splatted points; and
determining a vector offset of a horizon point from the viewpoint of interest.

9. The method according to claim 1, further comprising flagging as invalid a portion of the splatted points that comprise accumulated solid angles that do not meet or exceed an accumulated solid angle threshold.

10. The method according to claim 9, further comprising determining a distance from each pixel of the portion of the splatted points flagged as invalid to its nearest valid pixel, in order to estimate a density thereof.

11. The method according to claim 10, wherein valid pixels in a linearized depth buffer are determined to be visible in a view frustum.

12. The method according to claim 11, wherein the invalid splatted points are filled using the nearest valid pixel.

13. The method according to claim 12, further wherein the nearest valid pixels are blurred based on edge-preserving blur.

14. The method according to claim 1, further comprising computing an ambient occlusion term that is utilized when the point cloud is blended into the scene.

15. A system for real-time large scale point cloud surface reconstruction, the system comprising:
a hardware processor;
a memory communicatively coupled with the hardware processor, the memory storing instructions which when executed by the hardware processor performs a method, the method comprising:
receiving a large scale point cloud comprising a plurality of unstructured splatted points that each comprise a pixel;
performing a plurality of screen space operations on the plurality of unstructured splatted points;
applying an edge removal filter to the plurality of unstructured splatted points;
performing sparse region growing to the filtered plurality of splatted points to reconstruct the plurality of unstructured splatted points into a reconstructed point cloud surface;
determining visibility of splatted points in the point cloud, the splatted points each comprising at least one pixel;
filling empty regions between the splatted points using stenciling;
blurring filled regions within the point cloud; and
computing an eye-space density map of a scene that comprises the point cloud.

16. The system according to claim 15, wherein the method further comprises pruning density near edges of the eye-space density map using an edge creep operation during creation of the eye-space density map.

17. The system according to claim 15, wherein determining visibility of splatted points in the point cloud comprises: performing point occlusion using eye-space coordinates provided by a floating-point texture function to generate a single linearized depth output or an invalid value, so as to determine the splatted points' visibility for a view frustum.

18. The system according to claim 17, further comprising enhancing precision of the point occlusion by sampling on a primary ray when a gradient of a depth of a splatted point of the splatted points is not in a direction of a z-axis.

19. The system according to claim 17, further comprising enhancing precision of the point occlusion by:
assuming a local depth neighborhood of the at least one pixel is similar to itself; and
processing a ray distance using a triangle wave function in order to prevent aliasing from local depth neighborhood discontinuities.

20. A non-transitory computer-readable storage medium having embodied instructions thereon, the instructions executable by a processor to:
receive a large scale point cloud comprising a plurality of unstructured splatted points that each comprise a pixel;
perform a plurality of screen space operations on the plurality of unstructured splatted points;
apply an edge removal filter to the plurality of unstructured splatted points;
perform sparse region growing to the filtered plurality of splatted points to reconstruct the plurality of unstructured splatted points into a reconstructed point cloud surface;
determine visibility of splatted points in the point cloud, the splatted points each comprising at least one pixel;
fill empty regions between the splatted points using stenciling;
blur filled regions within the point cloud; and
compute an eye-space density map of a scene that comprises the point cloud.

* * * * *